United States Patent

Burklin et al.

[11] Patent Number: 5,394,286
[45] Date of Patent: Feb. 28, 1995

[54] METHOD FOR THE ADDRESSING OF ELEMENTARY HEADS OF A MULTIPACK HEAD FOR RECORDING ON A MAGNETIC MEDIUM, AND MAGNETIC HEAD IMPLEMENTING SAID METHOD

[75] Inventors: Helmut Burklin; Mario De Vito, both of Strasbourg, France

[73] Assignee: Thomson Consumer Electronics, Courbevoie, France

[21] Appl. No.: 195,834

[22] Filed: Feb. 14, 1994

Related U.S. Application Data

[63] Continuation of Ser. No. 772,675, Oct. 7, 1991, abandoned.

[30] Foreign Application Priority Data

Oct. 19, 1990 [FR] France ............... 90 12956

[51] Int. Cl.$^6$ .............. G11B 5/265; G11B 5/29; G11B 5/23; G11B 15/12
[52] U.S. Cl. .............. 360/121; 360/119; 360/63
[58] Field of Search .......... 360/63, 61, 62, 64, 360/119, 121, 123

[56] References Cited

U.S. PATENT DOCUMENTS

| 5,063,467 | 11/1991 | Colineau et al. | 360/123 |
| 5,124,869 | 6/1992 | Lehureau | 360/121 |

FOREIGN PATENT DOCUMENTS

| 0097836 | 1/1984 | European Pat. Off. | 346/74.5 |
| 0340085 | 11/1989 | European Pat. Off. | 360/121 |
| WO8700959 | 2/1987 | WIPO | 365/171 |

Primary Examiner—Aristotelis Psitos
Assistant Examiner—Jennifer Pearson
Attorney, Agent, or Firm—Oblon, Spivak, McClelland, Maier & Neustadt

[57] ABSTRACT

For the selection of the columns of elementary heads of a multitrack recording head, the method makes use of a bipolar pulse with amplitudes $+2I/3$ and $-2I/3$. For the selection of lines of elementary heads, it makes use of pulses with an amplitude of $+I/3$ or $-I/3$. And for the non-selected lines, it uses a bipolar pulse that is in phase opposition with respect to the column selection pulse and has amplitudes of $+I/3$ and $-I/3$.

4 Claims, 1 Drawing Sheet

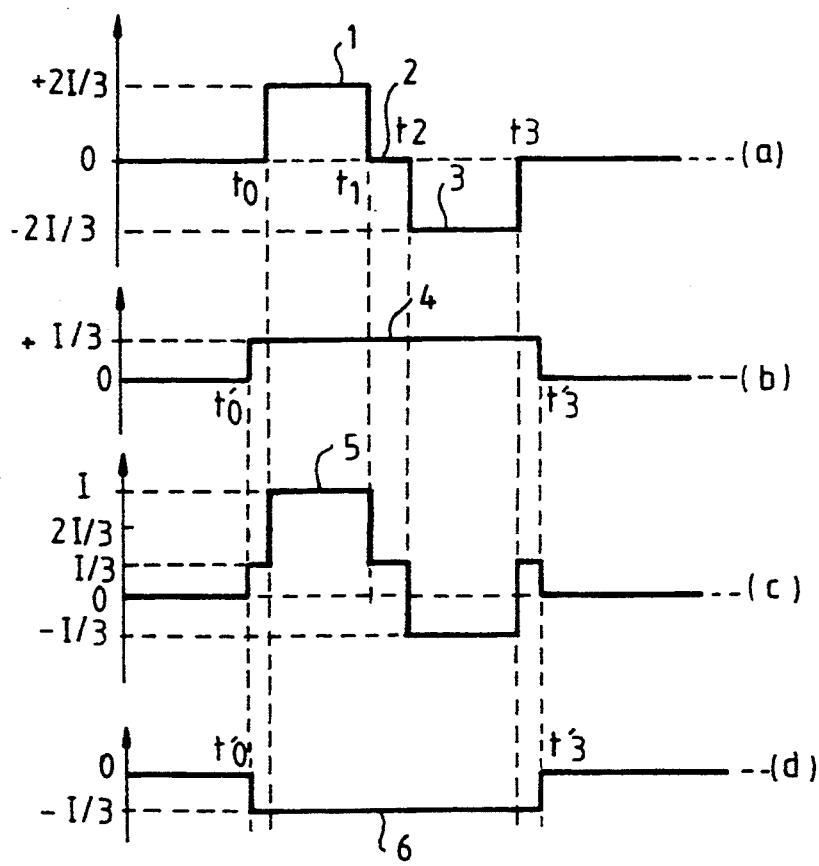
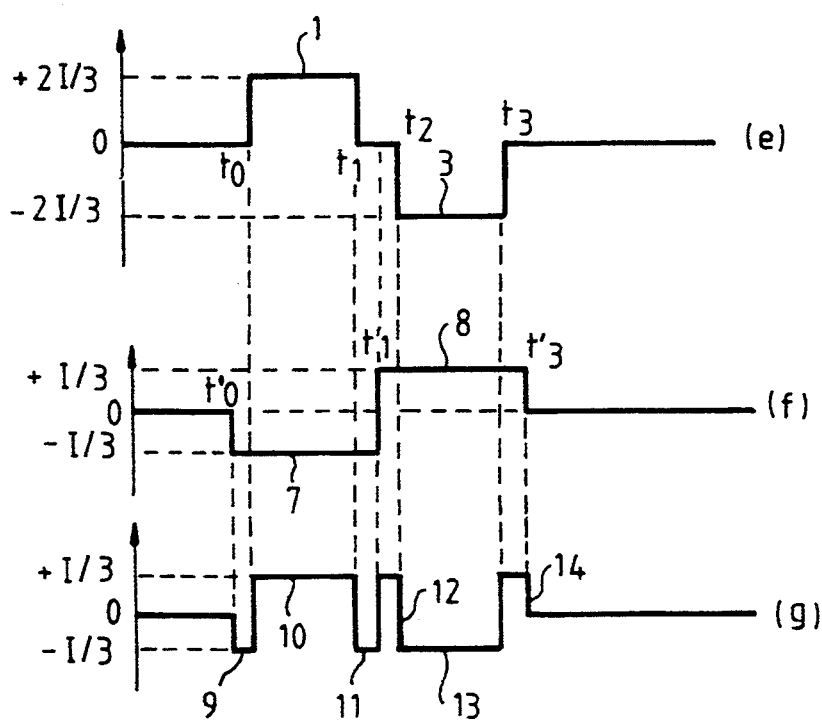

METHOD FOR THE ADDRESSING OF ELEMENTARY HEADS OF A MULTIPACK HEAD FOR RECORDING ON A MAGNETIC MEDIUM, AND MAGNETIC HEAD IMPLEMENTING SAID METHOD

This application is a continuation of application Ser. No. 07/772,675, filed on Oct. 7, 1991, now abandoned.

BACKGROUND OF THE INVENTION

1. Field of the Invention

The present invention relates to a method for the addressing of elementary heads of a multitrack head used for recording on a magnetic medium, a magnetic head implementing this method and an addressing circuit for such a head.

2. Description of the Prior Art

There is a known multitrack magnetic head, with a matrix arrangement of elementary heads, as disclosed for example in the document EP-A-0 340 085. A head such as this works in a substantially linear mode, i.e. the field that each elementary head creates at its gap is practically proportional to the sum of the excitation currents of this head (line and/or column current). The point of operation of each elementary head is chosen in such a way that the coercive field $h_c$ of the magnetic tape on which the head records information is located between the fields h/3 and h created by the head for excitation currents of respective values I/3 and I, the current I being the maximum excitation current.

The column signal is either a bipolar pulse with an amplitude of 2I/3 selecting the entire column of corresponding elementary heads or a signal of zero amplitude such that this column is not selected. The line writing signal is necessarily a pulse with a width greater than that of the bipolar pulse, and has an amplitude of +I/3 (to write +1) or −I/3 (to write −1).

In a known head such as this, the signal used to select one column alone may record an undefined intermediate state on the magnetic medium. The line signals sent to all the cells of the selected column make it possible to define the magnetic state to be recorded but thus dictate a writing operation by all these cells.

SUMMARY OF THE INVENTION

An object of the present invention is a method for the addressing of elementary heads, working in a substantially linear mode, of a multitrack head used for recording on a magnetic medium, said method enabling one or more elementary heads, but not necessarily all the elementary heads of the selected column, to write on the magnetic support, another object of the invention being a multitrack magnetic head and an addressing circuit for such a head.

According to the invention, there is proposed a method wherein a bipolar pulse is sent to each line of elementary heads that does not have to be selected, the pulses that constitute this bipolar pulse "overlapping" the column selection bipolar pulse, their transition occurring during the change in polarity between the pulses of the column selection signal, their polarities being opposite those of the pulses of the column selection signal, the absolute value of their amplitudes being about I/3, I being the maximum value of the excitation current of the magnetic circuits of the elementary heads.

BRIEF DESCRIPTION OF THE DRAWINGS

The present invention will be understood more clearly from the following detailed description of an embodiment, given as a non-restrictive example and illustrated by the appended drawings, of which:

FIG. 1 is a timing diagram of addressing signals according to the prior art;

FIG. 2 is a timing diagram of addressing signals according to the present invention.

MORE DETAILED DESCRIPTION

The starting point of the invention is a multitrack recording magnetic head. This head is of the matrix type with rows and columns of magnetic heads addressed by a network of electrical columns, also arranged in lines and columns. Each elementary magnetic head has an elementary magnetic circuit with a very small gap (having a width in the range of one micrometer). An elementary magnetic circuit corresponds to each intersection between line electrical conductors and column electrical conductors. Since I is the maximum excitation current of an elementary magnetic head in linear mode, it is necessary and sufficient, as specified here above, for the sum of the current of a column wire and the current of a line wire to be greater than about +2I/3 for the magnetic support before the elementary head located at the intersection between these two wires to go to the state +I, and it is necessary and sufficient for this sum to be smaller than about −2I/3 for the magnetic support to go to the state −1. Between these two terminals, the support does not change its state (in fulfilling the "memory" function of the magnetic support).

A column selection dual pulse (bipolar pulse) has been shown at (a) in FIG. 1. This dual pulse has, between the instants t0 and t1, a first single pulse 1 with an amplitude +2I/3, then a step 2 with a value of zero (between t1 and t2) and a second single pulse 3 (between t2 and t3) with an amplitude −2I/3. A line pulse 4, writing +1 in the corresponding elementary head, has been shown at (b). This pulse 4 with an amplitude +I/3 "overlaps" the dual pulse, i.e. its leading edge arrives at the instant t'0, slightly before t0, and its trailing edge arrives at the instant t'3 slightly after t3.

The signal resulting from the addressing of the elementary head has been shown at (c). This signal is the sum of the signals (a) and (b). Before t'0, it is zero. From t'0 to t0, it is equal to +I/3. Between t0 and t1, it is equal to +I. From t1 to t2, it is equal to +I/3, from t2 to t3, it is equal to −I/3, and from t3 to t'3, it is equal to +I/3, and then returns to zero after t'3. Only the part 5 of this resultant signal, that has an amplitude I (hence greater than 2I/3) and is between t0 and t1, is active and enables the writing of an information element (corresponding to +1) on the magnetic medium written on by the head.

Similarly, the pulse 6, shown at (d), with an amplitude −I/3, is between t'0 and t'3, and writes −1 in the corresponding elementary head. The signal (not shown) resulting from the addition of (a) and (d) is built in the same way as (c) and has only one active part, between t2 and t3, with an amplitude of −I.

Naturally, when the column signal is zero, the magnetic medium cannot be written on for neither the signal (b) nor the signal (d) has sufficient amplitude (+I/3 or −I/3) to write on this medium.

According to the invention, the column selection signal (e) (FIG. 2) is identical to the signal (a) and the line writing signals are always the signals (b) to write +1 and (d) to write −1.

By contrast, in order not to select a line, a signal such as the signal (f) of FIG. 2 is sent on this line. This signal (f) is a dual bipolar pulse "overlapping" the column selection signal. The signal (f) has a first single pulse 7 with an amplitude −I/3, the leading edge of which arrives at the instant t'0 as is the case for the signals (b) and (d). This pulse 7 ends at the instant t'1, located between t1 and t2, for example in the middle of the period of time t1–t2. In general, the duration of this period of time ranges from some nanoseconds to some tens of nanoseconds, and this is generally also the case for the periods of time t'0–t0 and t3–t'3. At the same instant t'1, there starts the second single pulse 8, which ends at the instant t'3, the amplitude of which is +I/3.

The addition of the signals (e) and (f) gives the signal (g) at the last line of FIG. 2. This signal (g) has: a short negative pulse 9 between t'0 and t0, a positive pulse 10 between t0 and t1, a short negative pulse 11 between t1 and t'1, a short positive pulse 12 between t'1 and t2, a negative pulse 13 between t2 and t3, and a short positive pulse 14 between t3 and t'3. The absolute values of all these pulses are all equal to I/3. As a consequence, this signal (g) can write nothing.

In certain cases, it is possible that the signal (e) will not have a step with a value of zero between t1 and t2 and, in such cases, the transition between the pulses 7 and 8 must coincide with the transition between the pulses 1 and 3. Naturally, in this case, the pulses 11 and 12 do not exist.

Naturally, if the signal (e) has, first of all, a negative pulse and then a positive pulse, the signal (f) must have, first of all, a positive pulse and then a negative pulse. It is necessary and sufficient for the pulses 7 and 8 of the signal (f) to have opposite polarities with respect to the pulses 1 and 3 of the signal (e) and for the transition between the pulses 7 and 8 to take place during the change in polarity between the pulses 1 and 3.

Thus, through the invention, it is enough to send a signal with a low amplitude (I/3) to the non-selected lines: this prevents these heads from writing and makes it possible to avoid modifying the state of the magnetic medium.

What is claimed is:

1. A method for the enabling of writing of selected ones of addressable elementary heads arranged in a matrix format with lines and columns of a plurality of said elementary heads, said elementary heads each having an elementary magnetic circuit each corresponding to an intersection between one of said lines of elementary heads and one of said columns of elementary heads, said elementary heads, working in a substantially linear mode, of a multitrack head used for recording on a magnetic medium, said method provided for said selection of particular ones of said magnetic heads to define a magnetic state to be recorded and thus a writing operation by said selected heads, said method comprising the steps of:
   providing a column selection bipolar pulse signal having maximum amplitude with an absolute value of 2I/3,
   providing line selections signals that overlap the column selection bipolar pulse signal and said line selection signals having maximum amplitude with an absolute value of I/3, and,
   providing on non-selected lines, a non-selecting bipolar pulse sent to each line of elementary heads not to be selected, said non-selecting bipolar pulse including pulses which overlap the column selection bipolar pulse, a changeover of said non-selecting bipolar pulse from a first polar state to a second polar state occurring the change in polarity between pulses of the column selection bipolar pulse signal, the polarities of the pulses of said non-selecting pulse being opposite the polarities of the pulses of the column selection bipolar pulse signal and the absolute value of the amplitudes of the pulses of said non-selecting pulse being I/3, I being the maximum value of the excitation current of the magnetic circuits of the elementary heads.

2. A method according to claim 1, wherein said column selection bipolar pulse signal is a dual pulse comprising a first single pulse with an amplitude of +2I/3, a step with a value of zero and a second single pulse with an amplitude of −2I/3, and wherein said line selection signals each constitute a line selection pulse which is a pulse with an amplitude of +I/3 or −/3 and wherein said line non-selecting bipolar pulse signal has a first single pulse with an amplitude of −I/3 and a second single pulse with an amplitude of +I/3.

3. A method according to claim 2, wherein said non-selecting pulses have the leading edge of the first single pulse arrive before the leading edge of the column section bipolar pulse and wherein a trailing edge of said second single pulse arrives after the trailing edge of the column selection bipolar pulse.

4. A method according to claim 3 wherein said line non-selecting pulses has a transition between the first single pulse and the second single pulse occurring during the zero value step of the column selection bipolar pulse.

* * * * *